No. 771,307. PATENTED OCT. 4, 1904.
E. M. HEWLETT.
MEANS FOR PROTECTING ELECTRIC CONDUCTORS.
APPLICATION FILED FEB. 9, 1903.
NO MODEL.

Witnesses.
J. Ellis Glenn.
Helen Orford.

Inventor.
Edward M. Hewlett
by Albert G. Davis
Atty.

No. 771,307.

Patented October 4, 1904.

UNITED STATES PATENT OFFICE.

EDWARD M. HEWLETT, OF SCHENECTADY, NEW YORK, ASSIGNOR TO GENERAL ELECTRIC COMPANY, A CORPORATION OF NEW YORK.

MEANS FOR PROTECTING ELECTRIC CONDUCTORS.

SPECIFICATION forming part of Letters Patent No. 771,307, dated October 4, 1904.

Application filed February 9, 1903. Serial No. 142,466. (No model.)

*To all whom it may concern:*

Be it known that I, EDWARD M. HEWLETT, a citizen of the United States, residing at Schenectady, county of Schenectady, State of New York, have invented certain new and useful Improvements in Means for Protecting Electric Conductors, of which the following is a specification.

The present invention relates to protector devices for electrical apparatus, and more particularly to devices for preventing the destructive effect of reactive discharges in inductive circuits.

The common practice for protecting electrical apparatus against abnormal or injurious currents of electricity consists in providing devices in the conductors which suddenly interrupt the current when it exceeds a certain volume or tension; but where there is considerable inductance in the circuit the sudden interruption of the current by these protector devices gives rise to very powerful reactive discharges in the form of sparks which jump across contiguous portions of the circuit and rupture the insulation.

The object of my invention is to provide means for automatically closing an inductive circuit through an auxiliary path of considerable resistance at the time or just before the main conductor-circuit is interrupted, as in the case of burning out of a fuse, to thereby prevent injury to the insulation by the destructive discharges of the induced current.

The invention will be more readily understood by reference to the accompanying drawings, forming a part of this specification, in which—

Figure 1:
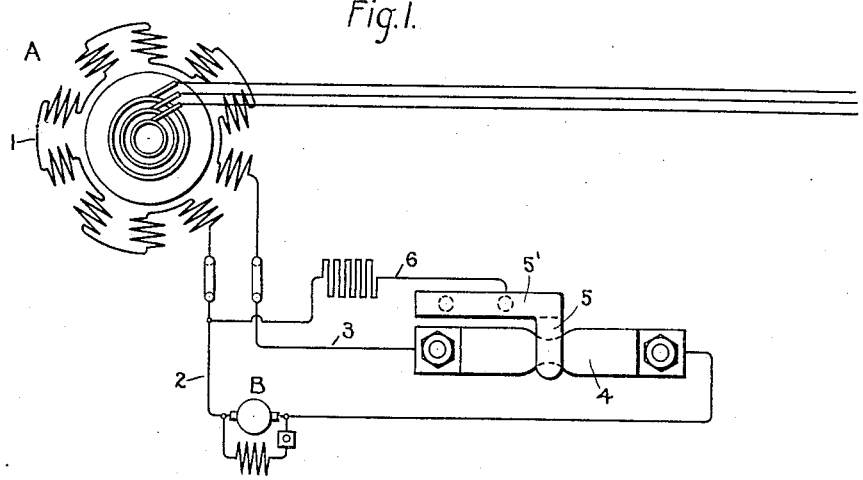
Figure 2:
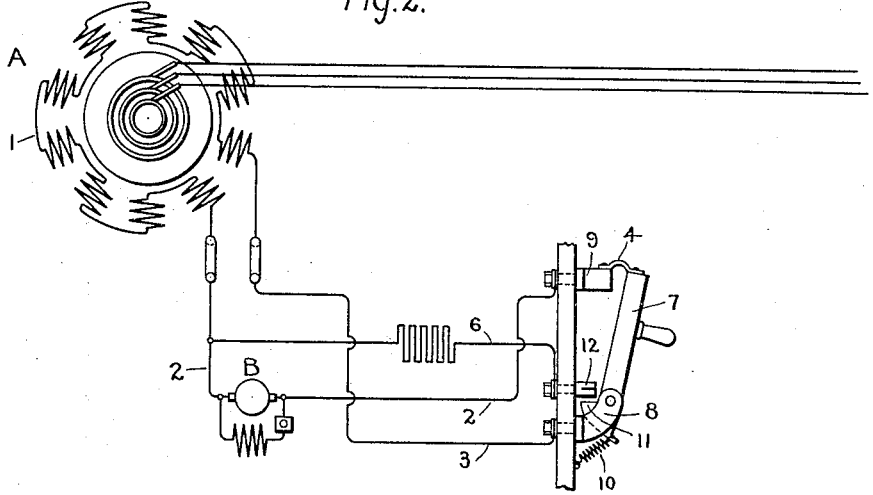
Figure 3:
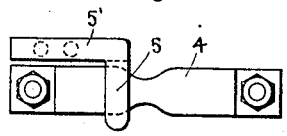
Figure 4:
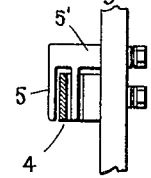

Figure 1 is a conventional representation of an exciter-circuit for an alternating-current machine provided with one form of protector device embodying my invention. Fig. 2 is a similar view with the circuit provided with another form of protector device, and Figs. 3 and 4 are details to be hereinafter referred to.

In the arrangement shown in the drawings the inductive conductor to be protected is that carrying the exciting-current of the field of the alternating-current machine A (indicated at 1) and having the leads 2 and 3 to the exciter B. As shown in Fig. 1, the lead 3 is provided with a thermal cut-out or fuse 4, and located in proximity thereto, but out of immediate contact, is a metallic finger 5, connected through the shunt or auxiliary resistance-conductor 6 to lead 2. The finger 5 may be bifurcated, as shown in Fig. 4, so that it will extend across both sides of the fuse and is supported by a shank 5', which is arranged in proximity to a binding-post of the fuse. The fuse 4 is shown with its cross-section reduced at its middle to insure its initial rupture at that point, and the metallic finger 5 is positioned directly opposite that point, so that a part of the arc will jump to the finger substantially at the instant of its formation and automatically complete a circuit through the auxiliary conductor 6. The action of the finger 5 would be substantially the same if it were somewhat removed from the restricted portion of the fuse, as shown in Fig. 3, for as soon as the fuse melts an arc is at once formed which envelops the finger and completes the circuit through the auxiliary conductor 6. The shank 5' of the finger, by means of its location in proximity to the fuse binding-post, provides an arcing-surface, so that the current may readily arc across the intervening space after the fuse has been burned away.

In the arrangement shown in Fig. 2 a switch-blade 7 is provided for positively and automatically closing the circuit through the auxiliary conductor 6 upon the blowing of the fuse 4. The switch 7 is connected to one lead-wire 3 through its pivoted support 8 and the other lead-wire 2 by means of the fuse 4, secured at its ends to the free end of the switch-lever and to a terminal contact 9, carrying the binding-post for the lead-wire 2. The switch-lever 7 is normally pressed away from the contact 9 by a spring 10 and is adapted to close automatically the circuit through the auxiliary circuit 6 by means of an integral projection 11 therefrom coming into engagement with the terminal contact 12 of the circuit 6 when the free end of the switch-lever is released by the blowing of the fuse 4. When the fuse blows, the current will arc across between the ruptured ends of the fuse until the switch-lever 7 has moved far enough to bring its projection 11 into engagement with the contact 12, thereby completing the field-circuit through the resistance-conductor 6 before the main exciter-circuit is broken.

If no resistance were inserted in the auxiliary conductor 6, the exciter would short-circuit itself therethrough unless the breaking of the exciter-circuit were simultaneous with the closing of the field-circuit through the auxiliary conductor 6.

My invention is capable of a variety of applications, and it is in no way restricted to the particular arrangements shown in the drawings.

What I claim as new, and desire to secure by Letters Patent of the United States, is—

1. The combination with an electric circuit having inductance in a section thereof, of means for breaking said circuit between said inductance-section and its source of excitation, and means for automatically closing the inductance portion of said circuit upon itself.

2. The combination with an electric circuit having inductance in a section thereof, of means for breaking said circuit between its source of excitation and said inductance-section, and means for automatically closing the inductance portion of said circuit upon itself through resistance.

3. The combination with an electric circuit having inductance in a section thereof, of a fuse for breaking said circuit between its source of excitation and said inductance-section, and means for automatically closing the inductance-section of said circuit upon itself upon the blowing of the fuse.

4. The combination with a field-circuit conductor and its exciter, of a thermal cut-out located in one side of said circuit, and a terminal finger located in proximity to said cut-out and connected by a resistance-conductor to the opposite side of said circuit.

5. The combination with a field-circuit conductor and its exciter, of a thermal cut-out located in one side of said circuit, a normally inactive circuit connected at one end to the opposite side of said circuit, and a terminal finger connected to the other end of said normally inactive conductor and located in proximity to said cut-out and adapted to be enveloped by the arc formed upon rupture of the cut-out thereby completing a path for the reactive discharge.

In witness whereof I have hereunto set my hand this 7th day of February, 1903.

EDWARD M. HEWLETT.

Witnesses:
 BENJAMIN B. HULL,
 HELEN ORFORD.